United States Patent [19]

Shimizu et al.

[11] Patent Number: 5,067,117
[45] Date of Patent: Nov. 19, 1991

[54] OUTPUT STABLIZING APPARATUS FOR AN OPTICAL HEAD

[75] Inventors: Hideo Shimizu; Yasuhiro Takahashi, both of Kawasaki, Japan

[73] Assignee: Fuji Electric Co., Ltd., Kawasaki, Japan

[21] Appl. No.: 426,278

[22] Filed: Oct. 25, 1989

[30] Foreign Application Priority Data

Oct. 28, 1988 [JP] Japan ............................ 63-272318

[51] Int. Cl.$^5$ ................................................ G11B 7/00
[52] U.S. Cl. .................................................... 369/116
[58] Field of Search ................ 369/100, 110, 116, 107, 369/122; 346/76 L, 135.1; 372/29

[56] References Cited

U.S. PATENT DOCUMENTS

| | | | |
|---|---|---|---|
| 4,516,242 | 5/1985 | Yokota | 369/116 |
| 4,580,044 | 4/1986 | Hongo et al. | 346/76 L X |
| 4,712,203 | 12/1987 | Saito et al. | |
| 4,733,398 | 3/1988 | Shibagaki et al. | 372/26 X |
| 4,805,579 | 2/1989 | Koyama | |

FOREIGN PATENT DOCUMENTS 56-7250  1/1981  Japan .................................. 369/116

Primary Examiner—Robert L. Richardson
Attorney, Agent, or Firm—Spencer & Frank

[57] ABSTRACT

An output stabilizing apparatus for an optical head having a semiconductor laser, a beam splitter, an optical projection system, a monitor photodiode and an automatic laser power control circuit. A main laser beam emitted from the semiconductor laser is split into two beams by the beam splitter. The monitor photodiode is disposed to receive one of the beams and generates a monitor signal. In response to the monitor signal, the automatic laser power control circuit controls the semiconductor laser intensity.

8 Claims, 4 Drawing Sheets

CENTPUT STABILIZING APPARATUS FOR AN OPTICAL HEAD

BACKGROUND OF THE INVENTION

1. Field of the Invention

The present invention relates to an optical head device for an optical or magneto-optical disc apparatus for performing writing, erasing or reading of data with respect to a recording medium such as an optical or magneto-optical disc and more particularly to an optical head device which stabilizes a light beam emitted from a semiconductor laser as a light source.

2. Description of the Prior Art

It is known from U.S. Pat. Nos. 4,712,203 and 4,803,579 that in an optical head device of an optical disc apparatus having a semiconductor laser as a light source, a portion of a laser beam output emitted from the semiconductor laser is detected by a monitor photodiode incorporated in the semiconductor laser so that a portion of the output power from the semiconductor laser is controlled in response to a signal detected by the monitor photodiode to stabilize the output of the laser beam.

For example, FIG. 1 shows a known semiconductor laser used in the conventional optical head device. In a container defined by a cap 104 having an aperture 103 and a stem 106 having terminals 107, a semiconductor laser element 101 is mounted on a heat sink 105 with its light-emitting face facing the aperture 103 within the container. A monitor photodiode 102 is fixed to the stem 106 with its light receiving surface facing the semiconductor laser element 101. A laser beam 110 with a light power output Po is emitted from the semiconductor laser element 101 through the aperture 103, and at the same time, a monitor beam 120 with a light power output Pm of about 3% of Po is emitted from the semiconductor laser element 101 toward the monitor photodiode 102. The laser beam 110 is directed through an optical projection system toward an optical disc as an information storage medium.

As shown in FIG. 2, in the case of a conventional automatic laser power control circuit for stabilizing the light power output of the laser beam 110 emitted from the semiconductor laser element 101, the monitor beam 120 incident on the monitor photodiode 102 generates a monitor signal. The monitor signal is fed back to a transistor 108 for driving the semiconductor laser element 101 through a transistor 107 so that the light power output Po of the laser beam 110 emitted from the semiconductor laser element 101 is maintained in a stable state. Concurrently, the transistor 108 is controlled by a transistor 109 which is controlled to turn on and off in response to an external signal Vin so that the ON-OFF of the laser beam 110 emitted from the semiconductor laser element 101 is controlled.

However, in the conventional optical head device with the automatic laser power control circuit as described above, a portion of the laser beam reflected back from an optical disc as a data storage medium and the laser beam reflected from the end face of an optical element in the laser beam projection system return into the semiconductor laser, and also a portion or a considerable amount of the reflected laser beams falls on the monitor photodiode 102. As a result, there arises a problem that the correct monitor output of the laser power cannot be obtained from the monitor photodiode 102.

More specifically, as shown in FIG. 3, let $\alpha_b$ be the transmission factor of a beam splitter (half mirror) in the laser beam projection system, $\alpha_d$: the reflection factor of the optical disc, and Pr: the amount of light 111 returned to the semiconductor laser element. The amount Pr is given by $Pr = \alpha_d \times \alpha_b^2 \times Po$ under the condition that the reflected laser beam reflected from the end face of the optical element and the eclipse or shading or the like of the optical projection system are neglected. The light output power Pn of a reflected back light beam 121, which is the returned light 111 incident on the monitor photodiode 102 through the semiconductor laser element 101, is given by the following equation:

$$P_n = 0.03 \times P_r$$

where the transmission factor of the semiconductor laser element 101 is 3%.

Therefore, the output error $\eta$ of the monitor photodiode 102 is expressed by the following equation:

$$\eta = P_n/(P_m + P_n) = 0.03 \times P_r/(0.03 \times P_o + 0.03 \times P_r) = \alpha_d \times \alpha_b^2/(1 + \alpha_d \times \alpha_b^2).$$

Accordingly, where $\alpha_d = 0.3$ and $\alpha_b = 0.7$, the output error $\eta$ comes up to 0.128. As a result, there arises a problem that the semiconductor laser element 101 is controlled by the automatic power control circuit which erroneously detects that the amount of the laser beam emitted from the semiconductor laser is higher than the actual amount Po of the laser beam by 12.8%.

The light amount of the returned light 111 varies with time depending upon oscillations of the surface or the axis of the rotated optical disc and other surface conditions. Thus, stable operation cannot be expected for automatic laser power control of the semiconductor laser element 101 in response to the monitored output of the returned light 111. The instability of the laser output power Po results in increasing noise when data is read out from the optical disc, causing a drop in a carrier-to-noise ratio (C/N).

In the case of apparatuses of the type in which information is read out in response to variations in the reflection factor of a compact disc (CD), a direct read-after-write type optical disc (DRAW) and the like, the returned light can be reduced by an isolator optical system which is a combination of a polarized beam splitter and a quarter wavelength plate. However, in the case of a magneto-optical disc (MO), the signal is derived in the form of an extremely slight rotation of plane polarization. Therefore, the isolator optical system cannot be utilized. As a result, in the case of the magneto-optical disc, it is extremely difficult to reduce the returned light. Actually, as shown in FIG. 1, it is practically impossible to stabilize the emitted laser beam 110 by using the monitor photodiode 120 incorporated in the semiconductor laser.

SUMMARY OF THE INVENTION

It is an object of the present invention to provide an optical head device which can eliminate the adverse effects caused by light returned from a data storage medium, so that the intensity of the emitted laser beam is stabilized.

It is another object of the present invention to provide an optical head device which can eliminate the adverse effects caused by light returned to a semiconductor laser along its principal optical path, so that the power of the laser beam is stabilized.

It is a further object of the present invention to provide an optical head device which can eliminate the adverse effects in relation to problems of a conventional device caused by the returned light and its variations which influence the power of the laser beam emitted from a semiconductor laser, and which is provided with a monitor function for stabilizing an automatic laser power control operation without a complicated construction.

The present invention is characterized in that an optical head device comprises a semiconductor laser, and a beam splitter.

In a first aspect of the present invention, an optical head device, comprises:

a semiconductor laser;

a beam splitter for dividing a laser beam emitted from the semiconductor laser into a first beam and a second beam;

an optical projection system for projecting the first beam transmitted through the beam splitter on a data storage medium;

photodetector means receiving the second beam split by the beam splitter for converting the received second beam into an electrical signal; and control means for controlling the intensity of the laser beam emitted from the semiconductor laser in response to the detected output from the photodetector means.

In a second aspect of the present invention, an optical head device, comprises;

a semiconductor laser for generating a linearly polarized laser beam in response to an inputted data signal;

a beam splitter for dividing the linearly polarized laser beam emitted from the semiconductor laser into a plurality of beams;

a lens system for projecting a fine spot condensed from the linearly polarized light beam transmitted through the beam splitter on a data storage medium;

a photodetector for receiving an optical signal reflected from the data storage medium and separated by the beam splitter and converting the received optical signal into an electric data signal;

photoelectric device for receiving a reflected component of the laser beam emitted from the semiconductor laser and separated by the beam splitter, and converting the reflected component into an electric signal at the time when a data signal is written, erased or read out with the laser beam with respect to the data storage medium; and a power control circuit for performing control of maintaining intensity of the laser beam emitted from the semiconductor laser at a constant value in response to the electric signal from the photoelectric device.

According to the present invention, a portion of linearly polarized light emitted from a semiconductor laser and shaped in the form of a circular beam is branched by a beam splitter (a half mirror) disposed on the principal optical path of an optical projection system, and the monitor output from a monitor photodiode disposed on the branched optical path is used as a feedback signal to an automatic power control circuit.

The above and other objects, effects, features and advantages of the present invention will become more apparent from the following description of embodiments thereof taken in conjunction with accompanying drawings.

BRIEF DESCRIPTION OF THE DRAWINGS

Embodiments of the invention will now be more particularly described with reference to the accompanying drawings in which.

DETAILED DESCRIPTION OF PREFERRED EMBODIMENTS

Figure 4:
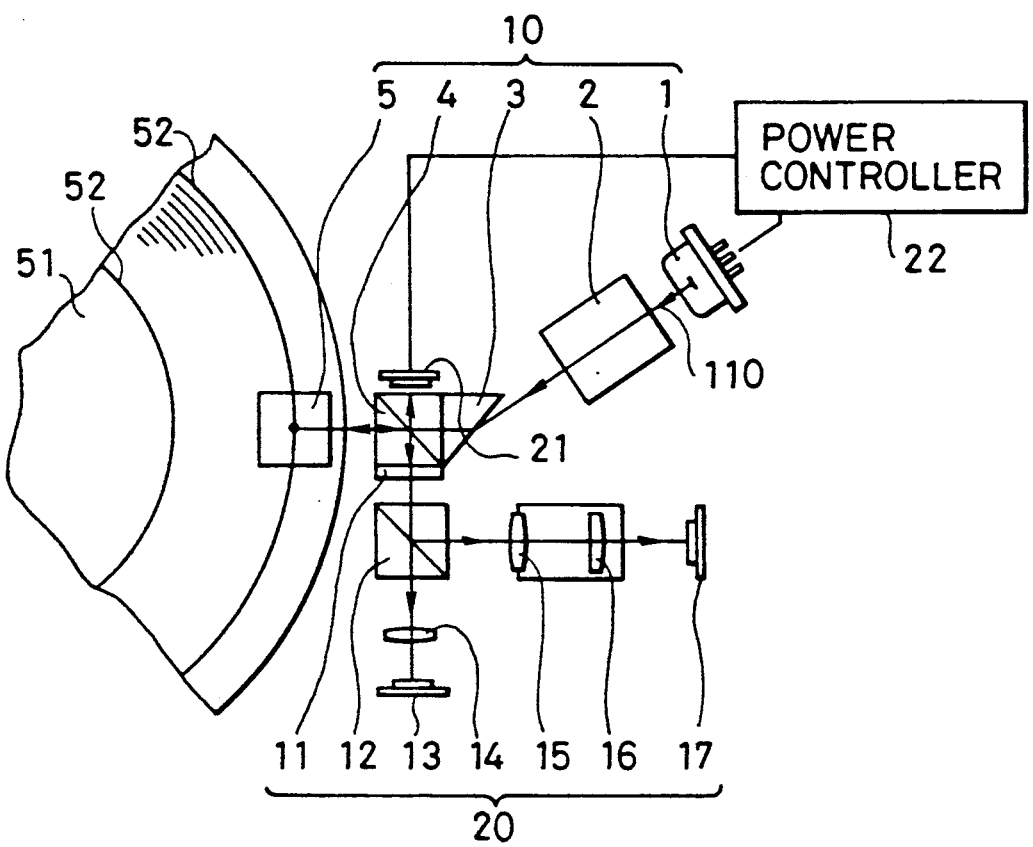
FIG. 4 is a planar view of one embodiment of an optical head device according to the present invention.
Figure 5:
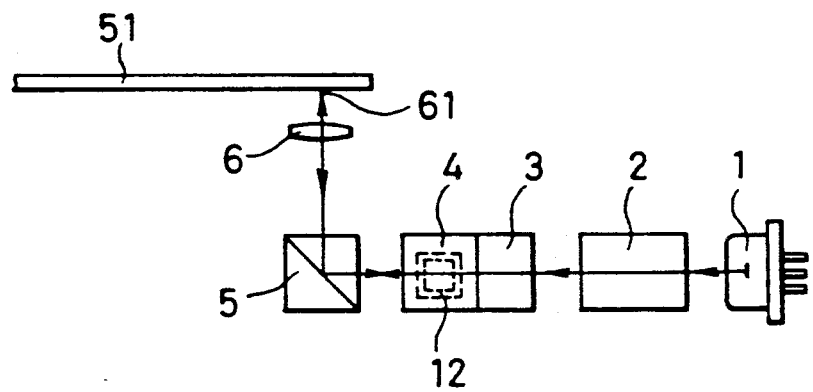
FIG. 5 is a side view showing major parts of the device shown in FIG. 4.

Referring to FIGS. 4 and 5, an optical head device according to one embodiment of the present invention comprises an optical projection system 10 and an optical detection system 20. In the optical projection system 10, a laser beam 110 emitted from a semiconductor laser 1 as a linearly polarized light source is collimated into a parallel luminous flux by a collimator-lens 2 and is shaped into a circular beam having an isotropic polarizing direction of linearly polarized light by a shaping prism 3. The shaping prism 3 expands or reduces the width of the laser beam on one side without changing the characteristic of the beam to shape an elliptic beam into the circular beam. Therefore, the shaping prism 3 is made of an optical glass which does not influence the characteristic of polarization of the beam, and comprises a triangular prism or a cylindrical lens.

Thereafter, the luminous flux of the circular laser beam is transmitted through a beam splitter (a half mirror) 4 having a transmission factor $a_b$ and is redirected upwardly by the reflection of a mirror 5, and is converged by an objective lens 6. Then, it is projected as an extremely small linearly polarized light spot 61 on a data track 52 of a data storage medium such as a magneto-optical disc 51. Then in response to the interaction between the extremely small spot 61 and the magnetic field of the data track 52, data is stored in or erased from the track 52.

The beam reflected from the data track 52 passes through the objective lens 6 and the mirror 5, and then is reflected again by the beam splitter 4 so that the optical path of the beam is redirected by 90° and introduced into the optical detection system 20. In the optical detection system 20, a convergent lens 14 and a photodetector 13 constitute a tracking error detection means of a push-pull type, while a convergent lens 15, a cylindrical lens 16 and a photodetector 17 constitute an astigmatism type focus error detection means.

The reflected light introduced into the optical detection system 20 passes through a half-wavelength plate 11 and is branched into two beams by a polarized beam splitter 12. One separate light beam passes the convergent lens 14 and is received by the photodetector 13 so that the photodetector generates a signal for preventing the fine spot 61 from being displaced from the desired data track 52. Simultaneously, the other separate light beam passes through the convergent lens 15 and the cylindrical lens 16, and is detected by the photodetector 17, so that the photodetector generates the signal for controlling a focus of the fine spot 61. In response to the signals outputted from the photodetectors 13 and 17, a reproduced data signal is produced.

Figure 1:
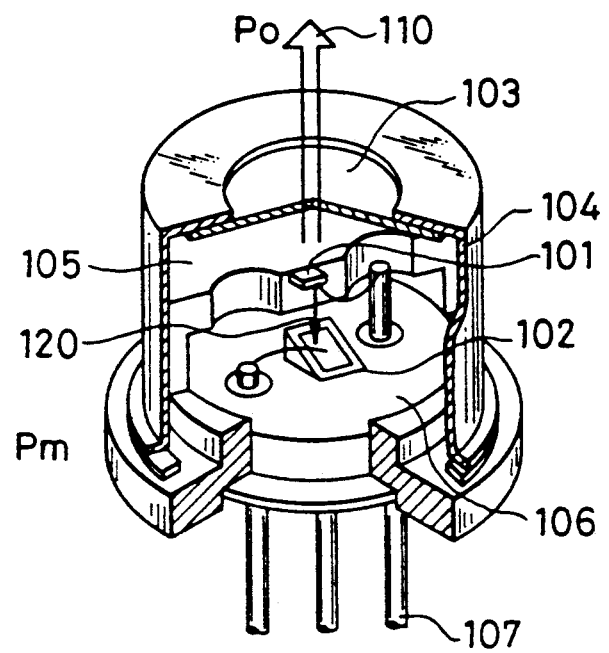
FIG. 1 is a perspective view showing the construction of a semiconductor laser of a conventional device with portions broken away for clarity.
Figure 2:
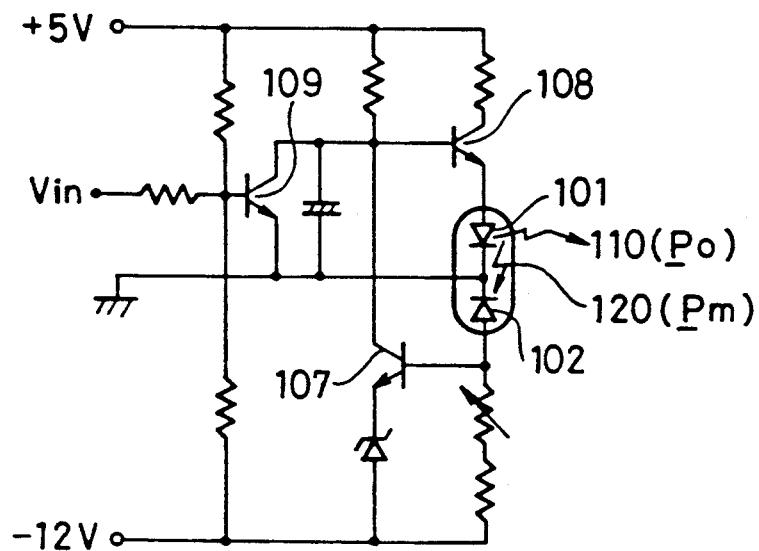
FIG. 2 is a circuit diagram showing an automatic power control circuit of the conventional device.
Figure 3:
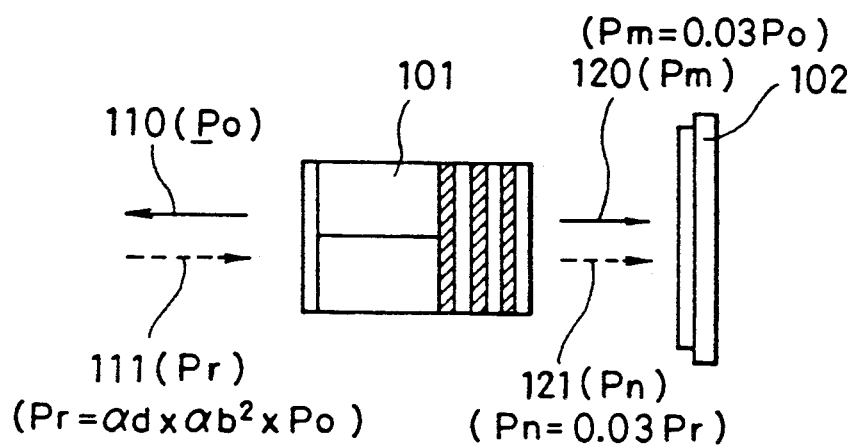
FIG. 3 is a schematic view showing the semiconductor laser of the conventional device shown in FIG. 1.

According to this embodiment, a monitor photodiode 21 is mounted on the face of the beam splitter 4 in an opposing relationship with the optical detection system 20. The output terminal of the monitor photodiode 21 is connected to an automatic laser power control circuit 22, which controls the semiconductor laser 1 in response to the output from the monitor photodiode 21 so that the amount Po of the laser beam emitted from the semiconductor laser 1 may be maintained at a predetermined value. The automatic laser power control circuit 22 used by the present invention is obtained by modifying the conventional circuit in such a manner that the monitor photodiode 102 of the conventional circuit as shown in FIG. 2 is replaced with the monitor photodiode 21 shown in FIG. 4, and resistance values of various parts are adjusted.

Figure 6:
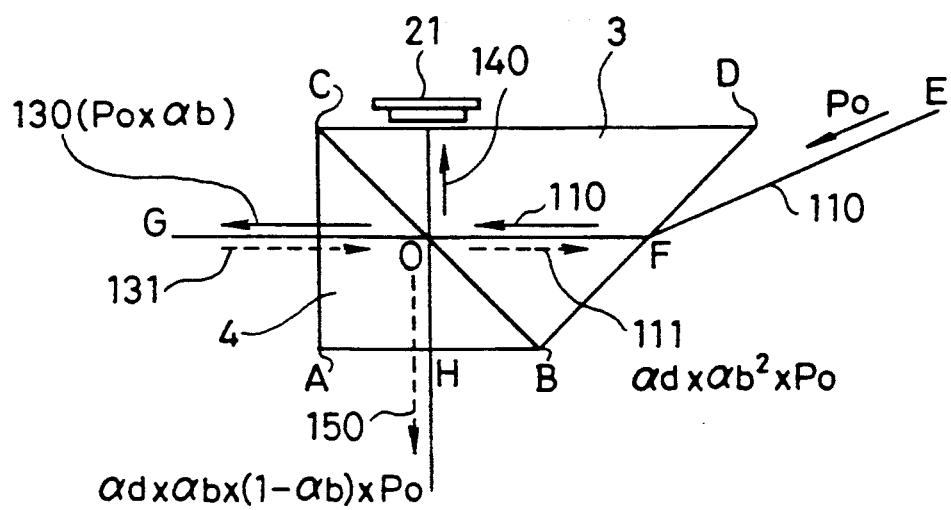
FIG. 6 is an enlarged view showing in detail a portion of the major parts of the embodiment shown in FIG. 4.

The operation of the automatic laser power control circuit 22 with the above-described construction of the embodiment will be explained with reference to FIG. 6. A parallel luminous flux of beams emitted from the semiconductor laser 1 and collimated by the collimator lens 2 into the laser beam 110 travels in the direction indicated by E and reaches the point F on the plane of incidence BD of the shaping prism 3. Due to the refraction of the beam 110 at the point F, it is shaped into a circular beam having the isotropic polarizing direction of linearly polarized light. Thereafter, the circular beam reaches the point 0 on the half mirror surface BC of the beam splitter 4.

Where a transmission factor of the half mirror surface BC is represented by $a_b$ and its refraction factor is represented by $(1-a_b)$, out of the amount Po of the laser beam 110 incident on the mirror surface BC, a small amount of the laser beam given by $Po \times a_b$ passes through the half mirror BC as a transmitted beam 130 traveling in the direction G toward the so-called upright directing mirror 5, and is converged into an extremely small spot 61 by the objective lens 6 to be projected on the date track 52 of the optical disc 51. Concurrently, reflected light 140 in an amount of $Po \times (1-a_b)$ is incident on the monitor photodiode 21. Where a coupling coefficient of the monitor photodiode 21 is represented by $a_o$, and an efficiency of photoelectric effect of it is represented by $\beta$ (of the order of 0.5 A/W), the electric output $I_M$ of the monitor photodiode 21 is expressed by the following equation:

$$I_M = Po(1-a_b)a_o \cdot \beta \quad (1)$$

While the transmitted light 130 is reflected by the optical disc 51 at the reflection factor $a_d$ and becomes the returned light 131 in the amount of $Po \times a_d \times a_b$ which has been returned to the point O on the half mirror surface BC. At the point O, the light amount of the returned light 131 is decreased to the amount $Po \times a_d \times a_b^2$ due to the transmission factor $a_b$ of the half mirror surface BC and divided into a component light as a returned light 111 which is returned to the semiconductor laser 1, and a component light as a reflected light 150 in the amount of $Po \times a_d \times a_b \times (1-a_b)$ which is reflected by the half mirror surface BC at the reflection factor $(1-a_b)$ and is directed to the optical detection system 20.

The reflection factor at the prism surfaces AB, AC and CD is generally 1% or less. As a result, even when light noise is produced by multiple reflection of the reflected light beams 131, 111, 150 etc. and travels toward the monitor photodiode 21, the amount of the light noise is negligible when compared with the amount $Po(1-a_b)$ of monitor light 140. Thus, the adverse effects caused by the returned light beams 131, 111 and 150 etc. can be almost eliminated.

In the equation (1), the transmission factor $a_b$ of the half mirror surface, the coupling coefficient $a_o$ of the photodiode 21 and the efficiency of photoelectric effect $\beta$ are constants to be determined depending upon optical and electrical elements to be used. Thus, it follows that the electric output $I_M$ from the monitor photodiode 21 is determined by the amount Po of the laser beam 110. In response to the electric output $I_M$, the automatic laser power control circuit 22 controls the electric power to be supplied to the semiconductor laser 1 so that the output power amount Po of the laser beam emitted from the semiconductor laser 1 can be maintained and stabilized at a predetermined value. A half mirror may be used instead of the beam splitter 12.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An output stabilizing apparatus for an optical head, comprising:

a semiconductor laser;

a beam splitter having a half mirror surface for dividing a laser beam emitted from said semiconductor laser into a first beam transmitted through said half mirror surface and a second beam reflected from said half mirror surface;

an optical projection system for projecting said laser beam emitted from said semiconductor laser onto said beam splitter and for projecting said first beam transmitted through said beam splitter onto a data storage medium;

photodetector means for receiving said second beam split by said beam splitter and for converting said second beam received thereby into an electrical signal; and control means for controlling the intensity of said laser beam emitted from said semiconductor laser in response to said photodetector means.

2. An output stabilizing apparatus for an optical head as claimed in claim 1, wherein said photodetector means is a photodiode.

3. An output stabilizing apparatus for an optical head as claimed in claim 1, wherein said optical projection system comprises:

a first optical system in which a linearly polarized laser beam emitted from said semiconductor laser is shaped into a linearly polarized circular beam, the circular beam being projected onto said beam splitter; and a second optical system for projecting onto said data storage medium as a fine spot, a portion of the linearly polarized circular beam transmitted through said beam splitter.

4. An output stabilizing apparatus for an optical head as claimed in claim 1, further comprising:

a light reception system for converting a received optical signal into an electric data signal, the received optical signal being reflected from said data storage medium and transmitted by said beam splitter.

5. An output stabilizing apparatus for an optical head as claimed in claim 4, wherein said received optical signal reflected from said data storage medium is not received on said photodetector means by means of said beam splitter.

6. An output stabilizing apparatus for an optical head, comprising:

a semiconductor laser for generating and emitting a linearly polarized laser beam in response to an inputted data signal;

a first optical system for shaping said linearly polarized laser beam emitted from said semiconductor laser;

a beam splitter having a half mirror surface, for dividing said linearly polarized laser beam emitted from said semiconductor laser and shaped by said first optical system, into a first linearly polarized light beam transmitted through said half mirror surface and a second linearly polarized light beam reflected from said half mirror surface;

a lens system for condensing into a fine spot said first linearly polarized light beam transmitted through said beam splitter, and for projecting said fine spot onto a data storage medium;

a photodetector for receiving an optical signal reflected from said data storage medium and separated by said beam splitter and for converting said optical signal received thereby into an electric data signal;

a photoelectric member for receiving said second linearly polarized light beam separated by said beam splitter, and converting said second linearly polarized light beam into an electric signal at the time when a data signal is written to, erased or read out from said data storage medium with said laser beam; and a power control circuit for performing control by maintaining the intensity of said linearly polarized laser beam emitted from said semiconductor laser at a constant value in response to said electric signal from said photoelectric member.

7. An output stabilizing apparatus for an optical head as claimed in claim 6, wherein:

said first optical system shapes said linearly polarized laser beam emitted from said semiconductor laser into a circular beam; and said beam splitter divides said circular beam into a plurality of beams.

8. An output stabilizing apparatus for an optical head comprising:

a semiconductor laser;

a beam splitter, having a half mirror surface which reflects a light beam incident both from front and rear directions of said half mirror surface and transmits a portion of said light beam as well, for dividing a laser beam emitted from said semiconductor laser into a first beam transmitted through said half mirror surface and a second beam reflected from one side of said half mirror surface;

an objective lens for projecting said first beam as a fine spot onto a data storage medium;

a photodetector for detecting data stored in said data storage medium upon receipt of said first beam after said first beam has been projected by said objective lens onto said data storage medium as a fine spot, reflected from said data storage medium, and reflected from the other side of said half mirror surface; and control means for controlling the intensity of the laser beam emitted from said semiconductor laser in accordance with said second beam.

* * * * *

UNITED STATES PATENT AND TRADEMARK OFFICE
CERTIFICATE OF CORRECTION

PATENT NO. : 5,067,117

DATED : November 19th, 1991

INVENTOR(S) : Hideo SHIMIZU ET AL.

It is certified that error appears in the above-identified patent and that said Letters Patent is hereby corrected as shown below:

```
Title page, item [75] should read:  Inventors:  Hideo Shimizu,
Yasuhiro Takahashi and Junji Ogawa, all of Kawasaki, Japan.
```

Signed and Sealed this

Twenty-first Day of September, 1993

Attest:

BRUCE LEHMAN

*Attesting Officer*  *Commissioner of Patents and Trademarks*